March 14, 1944.  L. A. YOUNG  2,344,381
NUT
Original Filed May 3, 1940
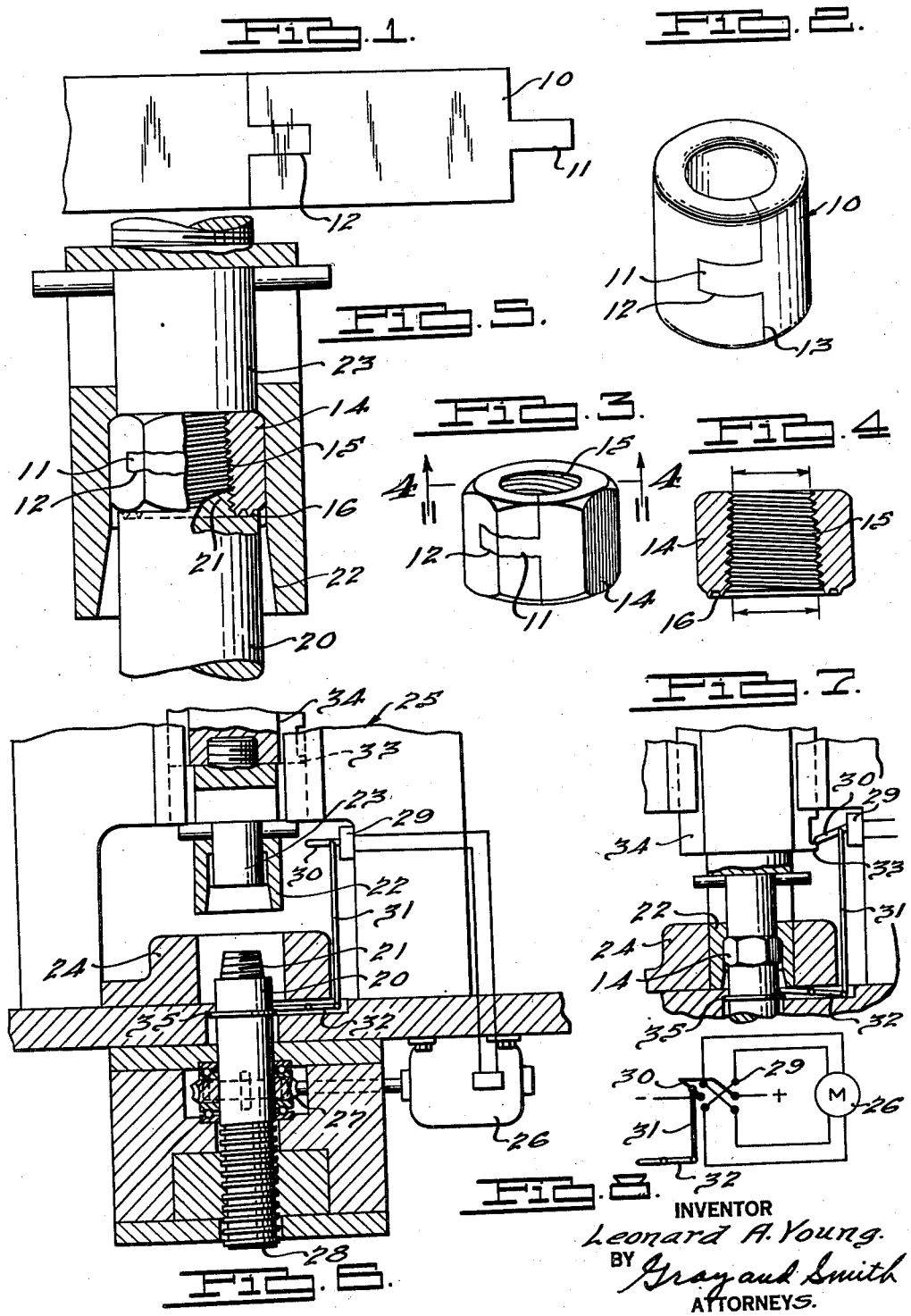
INVENTOR
Leonard A. Young.
BY Gray and Smith
ATTORNEYS.

Patented Mar. 14, 1944

2,344,381

UNITED STATES PATENT OFFICE 2,344,381

NUT

Leonard A. Young, Detroit, Mich.

Original application May 3, 1940, Serial No. 333,191. Divided and this application January 17, 1942, Serial No. 427,089

2 Claims. (Cl. 151—37)

The present invention relates to a threaded nut or the like. The present application is a division of my copending application Serial No. 333,191, application filed May 3, 1940.

One of the objects of the present invention is to provide a threaded nut or the like and apparatus for manufacturing or forming the same in which the threads and the body contours of the nut are formed simultaneously in a single upsetting operation.

Another object of the invention is to provide a threaded nut or the like in which the threaded portion thereof is provided with slightly tapered walls and an annular flange is formed adjacent the end of the threaded portion having the greatest diameter, said annular flange and the tapered threaded opening cooperating to securely lock the nut on a bolt and prevent unintended disengagement thereof.

A further object of the present invention is to provide a threaded nut and improved apparatus for manufacturing or forming the same which is particularly characterized by an economical use of the material and the elimination of a large amount of scrap material, the novel apparatus being further characterized in that much labor and material handling, as well as numerous separate machine operations, are eliminated.

The present application is related to the disclosures in Patent No. 2,199,007 on jointed nut and method of making same, filed in the name of John M. Oldham and assigned to me, and to my prior Patent No. 2,201,806 entitled "Method of uniting metal surfaces."

The present invention is particularly but not exclusively applicable to the formation of threaded nuts from relatively soft metal such, for example, as copper, lead, brass, aluminum and the like, or the soft alloys of such metals or other metals. These metals are characterized in that they are more readily deformable under pressure than are some other materials, such for example, as the ferrous metals. It is to be understood, however, that the invention is not limited strictly to the use of such materials as it is within the purview of the present invention to use any metal which is deformable under pressure and from which it may be desired to form a threaded nut.

The foregoing and other objects and advantages of the present invention will appear in the following description and appended claims, reference being had to the accompanying drawing forming a part of this specification wherein like reference characters designate corresponding parts in the several views.

In said drawing:

Fig. 1 is a plan view of a flat blank which may be used in an initial stage of the method herein disclosed;

Fig. 2 is a view in perspective of the blank shown in Fig. 1 folded upon itself and joined to provide a hollow substantially cylindrical blank;

Fig. 3 is a view in perspective of a completed machine nut embodying the present invention;

Fig. 4 is a section taken substantially on the line 4—4 of Fig. 3;

Fig. 5 is a fragmentary section with parts broken away showing an upsetting die and a formed nut at the completion of the upsetting operation;

Fig. 6 is a fragmentary section showing the upsetting die and a portion of the press, the parts of the die being shown in their relative positions after completion of the upsetting operation and ejection of the nut from the die, the parts being shown in their relative positions preparatory to receiving another blank;

Fig. 7 is a fragmentary view partially in section showing the upsetting die and the mechanism for controlling actuation of the thread-forming mandrel; and Fig. 8 is a diagrammatic view illustrating a control circuit which may be used in accordance with the present invention to control actuation of the thread-forming mandrel.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

Referring to the drawing, and particularly to Fig. 1, there is shown a blank 10 which may be formed of any desired metallic material and may be formed either by a slitting operation on flat metal stock or by cutting a flattened piece of wire, rod or bar stock. The slitting of the stock is so carried out as to provide an extending tongue 11 and a mating groove 12 on opposite ends of the blank 10.

As shown in Fig. 2, the blank 10 is folded upon itself to form a hollow substantially cylindrical blank in which the tongue 11 is received in the groove 12 and the ends of the blank mate at the mating shoulder surfaces 13. The cylindrical blank as shown in Fig. 2 is the form in which the blank is preferably used in the subsequent upsetting operation to form the completed nut which, as shown in Figs. 3 and 4, may comprise a body portion 14 having a predetermined exterior contour which may be hexagonal, rectangular, square, etc., and a threaded interior 15 which, as shown in Fig. 4, is of a slightly larger diameter adjacent one end of the nut than it is adjacent the other end thereof. This construction provides a centrally disposed tapered annulus which tapers in a preferred embodiment of the invention to the extent of approximately .002 to .003 of an inch per one-half inch of length of the tapered opening.

The body portion 14 of the nut is provided with annular depending flanges 16 which are preferably provided adjacent the end of the threaded opening 15 which has the greatest diameter. The flanges 16 when so disposed form a ready means of identifying the end of the nut where the threaded opening has the greatest diameter and also indicate the end of the nut which is to be first brought into engagement with a threaded bolt or stud to which the nut is intended to be attached. By this construction a nut is provided which may be readily threaded on the extending end of a threaded bolt, stud, or the like, and due to the tapered threaded opening in the nut there is a wedging action on the threads of the threaded bolt or stud which assists in holding the nut on such bolt or stud. This action is further accentuated when the flanges 16 are brought in contact with a surface adjacent an end of the threaded bolt or stud since the flanges preferably are V-shaped in cross section and have a sharp edge portion which will bite into such surface when the nut is securely screwed onto the screw-threaded bolt or stud.

As shown in Fig. 3, in the completed nut the mating tongue 11 and the groove 12 are so deformed that the parts are interlocked and this provides a jointed body portion on the nut which, however, is securely locked in such a manner that the ends will not readily become separated.

In forming a nut embodying the present invention, or in forming nuts similar to those disclosed in said Oldham Patent No. 2,199,007 and in my prior Patent No. 2,201,806, an apparatus is employed which includes an upsetting die such, for example, as that shown in Figs. 5, 6 and 7 of the present drawing. As shown, the upsetting die comprises an anvil 20 having a tapered threaded mandrel 21 formed on the end thereof. A female upsetting or coining die 22, having a knockout plug 23 thereon, is so positioned and formed relative to said anvil 20 that it surrounds the anvil in predetermined spaced relation thereto.

A retaining ring 24 is provided adjacent the bed plate of the machine and acts to support the female die 22 and prevent the breakage of said die due to the pressure created therein by the upsetting operation. The female die 22 is secured to a suitable press 25 for reciprocal movement in a substantially vertical plane relative to the anvil 20. The anvil 20 and the mandrel 21 are mounted for movement in a spiral path which has substantially the same pitch as the threads on the tapered threaded mandrel 21. The movement of the anvil 20 in the embodiment here shown is caused by a reversing electric motor 26 which drives a gear 27 which mates with a worm gear 28 preferably formed on the end of the anvil 20 opposite the tapered mandrel 21.

The motor 26 is controlled by a switch 29 actuated by a switch lever 30 which is connected with a switch lever connecting rod 31 and an auxiliary switch lever 32. Upon operation of the die 22 the lever 30 is moved to actuate the switch 29 by the annular shoulder 33 on the ram 34 of the press 25 and is moved synchronously with the movement of the female die 22. The lever 32 is connected through the rod 31 with the lever 30 and is moved to actuate the switch by the shoulder 35 which is provided on the anvil 20. When the parts are in the position shown in Fig. 6, the anvil 20 has been driven in its upward spiral path to a position where the shoulder 35 contacts the lever 32 and moves it to stop the motor 26.

After the completion of the upsetting operation and when the parts of the die have moved into the position shown in Fig. 7, the ram 34 has been moved to actuate the lever 30 which starts the motor 26 which causes movement of the anvil 20 and the mandrel 21 in a descending spiral path. This causes the mandrel 21 to be unscrewed from the formed nut 14. When this movement of the anvil has been completed, the female die 22 is then moved upwardly and carries the nut with it until the knockout plug 23 is actuated and the nut is ejected from the female die 22. When the parts have been moved so as to bring the knockout plug into operation, the lever 30 has been carried into position where the motor 26 is reversed and the anvil 20 and mandrel 21 have been driven in an ascending spiral path to the position shown in Fig. 6. At the completion of this upward movement of the anvil 20, the shoulder 35 actuates the lever 32 and shuts off the motor 26.

In Fig. 8 there is shown a diagrammatic view of the electrical circuit which may be employed to actuate the motor from the lever 30 which actuates the switch 29 as above described. It is to be understood, however, that other types of control mechanisms or actuating devices may be employed, if desired, instead of the electric motor and controlling switches here shown. For example, a hydraulically actuated prime mover and control device may be used for the purpose of moving the anvil 20 and the thread-forming mandrel. Also, it is to be understood that the thread-forming mandrel and anvil 20 may be stationary, if desired, and the female upsetting die 22 may be rotated as it is moved away from the anvil and thus free the nut from the threads on the mandrel.

In carrying out the present invention the thread-forming mandrel 21 carried by the anvil 20 is preferably formed of some metal harder than the metal used in forming the blank 10 which is deformed by the upsetting operation. For example, an oil impregnated type of bearing metal may be used in forming the mandrel 21 for use on certain types of metals, while harder metal may be used in other instances. The pitch and lead of the threads on the worm gear 28 should be such that the mandrel 21 and the anvil 20 are rotated and moved in a descending spiral path at the same rate that the thread-forming portion of the mandrel 21 is unscrewed from the threads in the formed nut 14.

It will be seen in carrying out the present invention that the threads thus formed on the interior of the nut are formed at the same time that the exterior portion of the nut is formed and that the threads are pressed into a work-hardened surface portion of the metal blank forming the nut since the walls of the annular opening of the blank 10 are formed of the surface material adjacent one surface of the flat blank. As is known, this work-hardened metal is generally denser than in some interior portion of the blank and the result is that the threads pressed from this surface are somewhat harder than if formed of the interior of the blank, and since they are formed under a very substantial pressure, the metal has taken a permanent set and has become further work hardened so that the threads have the appearance of a coined metal surface. In this way a much smoother and more durable thread may be formed than where it is necessary to perform a further thread-cutting operation on the pressed metal nut.

In addition to eliminating waste of material due to the cutting of the threads, it will also be seen that the present invention provides a novel apparatus for forming the threads simultaneously with the forming of the nut itself and thus eliminate separate material handling and machining of the nut.

I claim:

1. A metal lock nut comprising a jointed, work-hardened body portion having frusto-conical work-hardened threaded interior and spaced concentric work-hardened sharp annular locking flanges extending downwardly from the base of said body portion adjacent the largest diameter of said threaded opening.

2. A metal lock nut comprising a jointed, work-hardened body portion having a frusto-conical work-hardened threaded interior and having an inclination from the base inwardly toward the top thereof, of from approximately .002 to .003 of an inch for each one-half inch of length of said opening, and a plurality of spaced concentric work-hardened sharp annular locking flanges extending downwardly from the base of said body portion adjacent the largest diameter of said threaded opening.

LEONARD A. YOUNG.